United States Patent [19]
George

[11] 3,907,340
[45] Sept. 23, 1975

[54] FLANGE-BOILER INSULATION COVER ATTACHMENT

[75] Inventor: Robert J. George, Dallas, Tex.

[73] Assignee: Forney Engineering Company, Carrollton, Tex.

[22] Filed: Apr. 8, 1974

[21] Appl. No.: 458,730

[52] U.S. Cl. .............. 285/192; 285/286; 248/27; 248/56; 431/189
[51] Int. Cl.² .......................................... F24C 3/10
[58] Field of Search ...... 126/318, 314, 315; 248/56, 248/27; 285/424, 192

[56] References Cited
UNITED STATES PATENTS

| | | | |
|---|---|---|---|
| 518,692 | 4/1894 | Heme | 126/314 |
| 549,217 | 11/1895 | Schaab | 126/315 |
| 1,006,448 | 10/1911 | Liehl | 285/192 |
| 1,060,328 | 4/1913 | Farley | 126/314 |
| 1,278,704 | 9/1918 | Mannon | 126/314 |
| 1,803,894 | 5/1931 | Cross | 248/56 |
| 1,932,610 | 10/1933 | Tilley | 165/184 |
| 2,372,795 | 4/1945 | Rodeck | 165/184 |
| 2,687,862 | 8/1954 | Crowther | 248/27 |
| 2,737,370 | 3/1956 | Frisch et al. | 165/182 |

*Primary Examiner*—Carroll B. Dority, Jr.
*Attorney, Agent, or Firm*—John P. De Luca; Marvin A. Naigur; John E. Wilson

[57] ABSTRACT

A mounting flange for an object has been provided wherein a strip of bendable material having an L-shaped cross section, one end leg of the L being substantially longer than the other said strip, has transverse cuts therein extending across the entire length of the longer end of the member, permitting the strip to be bent in a circular or circumferential pattern about the periphery of the object. The mounting flange when formed about the periphery of the object forming radial strips extending outwardly in a plane from the outer surface of the object and fastened about the periphery of the object along the surface of the short leg of the L-shaped member.

7 Claims, 5 Drawing Figures

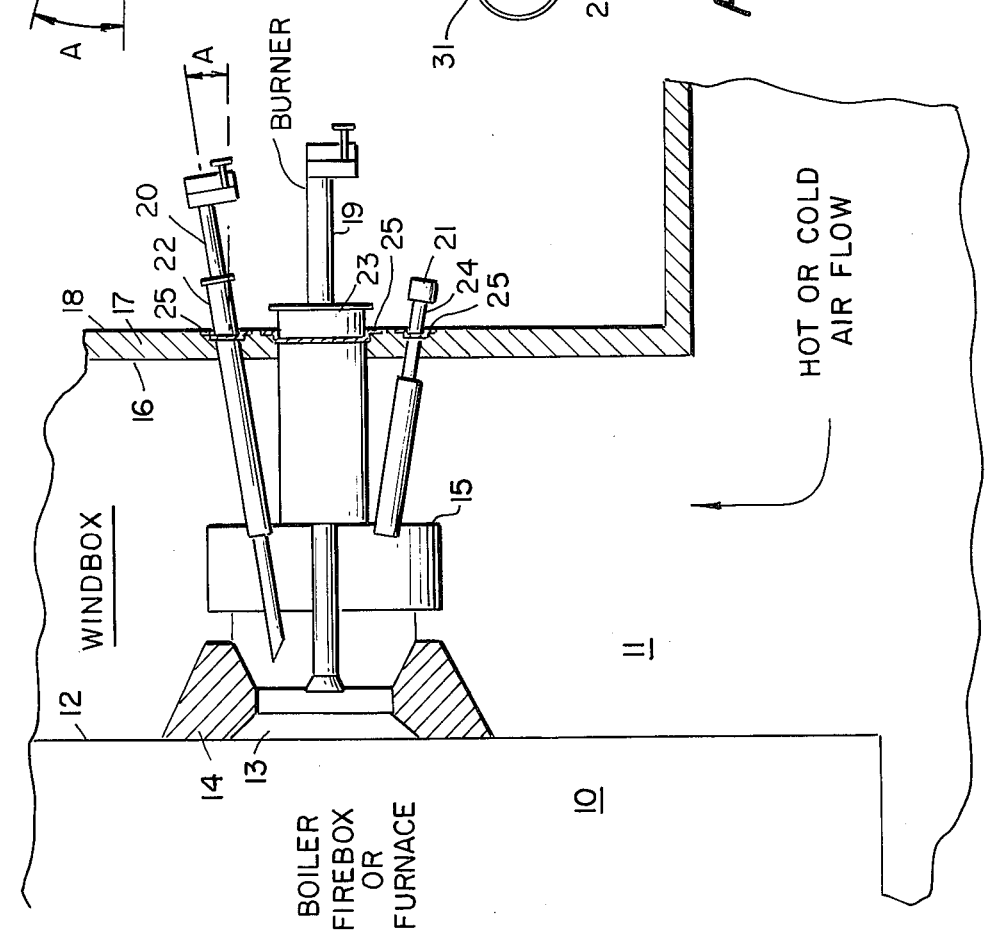
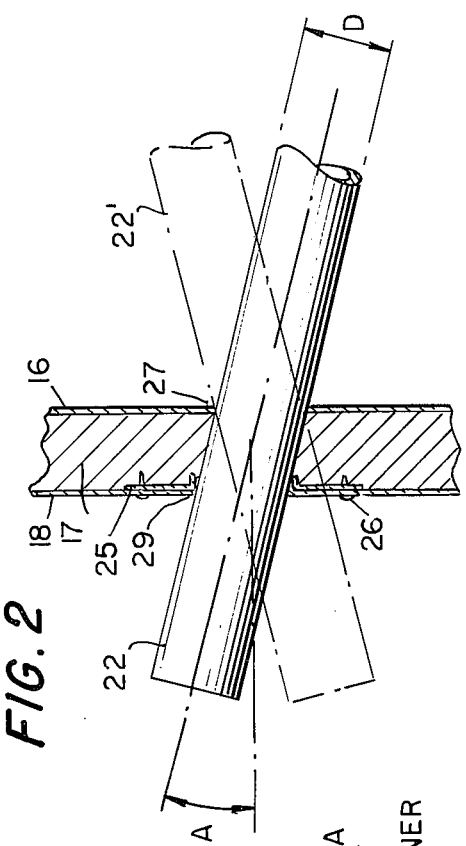
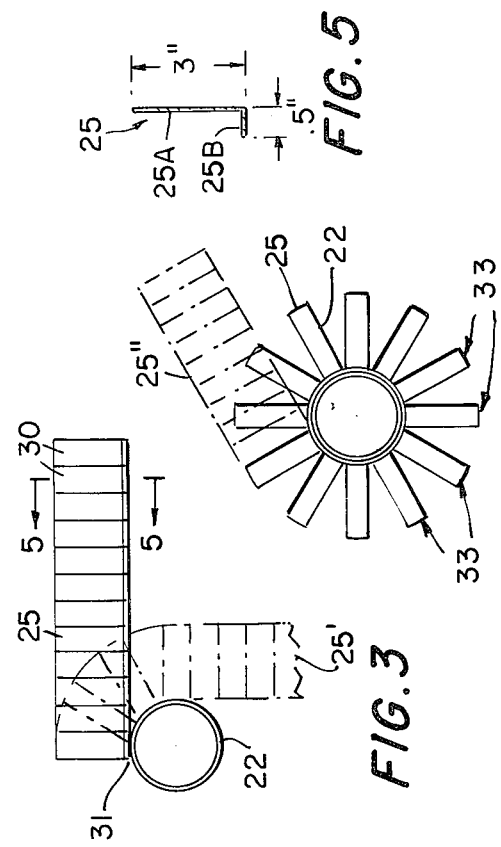

FLANGE-BOILER INSULATION COVER ATTACHMENT

BACKGROUND OF THE INVENTION

In boiler windbox installations, it is necessary to cut holes through the windbox outside plate and to install mounting tubes therein which are utilized for receiving burners, igniters, and flame detectors among other devices. The mounting tubes are welded in an opening in the windbox outside plate and extend some distance beyond the exterior portions of the windbox itself. Over the windbox and boiler outside walls, there is usually an insulation covering of some sort of selected thickness for insulating the radiated heat from the boiler firebox wall into the windbox. There is usually installed over this insulation a sheet metal covering having holes therein for receiving the extensions of the mounting tubes.

One of the problems in this type of situation is that the holes drilled or cut in the sheet metal covering remain unsecured over the insulation itself adjacent the tubes or objects. This type of configuration is unacceptable for structural soundness.

Since the openings in the sheet metal covering are usually cut at the site of the boiler installation, a simple low cost and efficient method of attaching the sheet metal to the insulation and securing it in place has become necessary, and such an attaching means is one of the objects of the present invention.

Another object of the present invention is to provide a mounting flange adaptable for various sizes and angular boiler wall penetrations.

It is another object of the present invention to provide a simple design which may be readily adapted at the installation site.

It is yet another object of the present invention to provide a mounting flange which may be welded or brazed to the mounting tube at the installation site quickly and with simple hand tools.

SUMMARY OF INVENTION

A mounting flange for an object has been provided wherein a strip of bendable material having an L-shaped cross section, one end leg of the L being substantially longer than the other said strip, has transverse cuts therein extending across the entire length of the longer end of the member permitting the strip to be bent in a circular or circumferential pattern about the periphery of the object. The mounting flange when formed about the periphery of the object forming radial strips extending outwardly in a plane from the outer surface of the object and fastened about the periphery of the object along the surface of the short leg of the L-shaped member.

For a better understanding of the present invention together with other and further objects thereof, reference is directed to the following description taken in connection with the accompanying drawings, while its scope will be pointed out in the appended claims.

DESCRIPTION OF THE DRAWINGS

FIG. 1 is a plan view of a typical boiler environment in which the present invention is to be utilized;

FIG. 2 is a detail showing a section of the mounting tube installed within a windbox wall including a phantom drawing showing an alternate angular installation therewith;

FIG. 3 is a detail including a phantom drawing showing the initial installation of the mounting flange;

FIG. 4 is a detail showing the flange as it is suitably attached to the mounting tube; and FIG. 5 is a cross sectional view of the member along line 5—5 of FIG. 3.

DESCRIPTION OF THE PREFERRED EMBODIMENTS

Referring to FIG. 1, a furnace 10 having a windbox area appropriately labeled 11 is illustrated. The windbox permits the flow of air therein for supplying the air for combustion. In a wall 12 of the furnace 10 there is an opening 13 and a throat 14 therefor and possibly with an air register 15, the aforementioned structure being typical of boiler installations.

To the right in FIG. 1, there is illustrated a so-called outside windbox wall 16, typically one quarter inch steel plate, over which an insulation 17 is disposed for insulating the boiler and windbox walls. A thin sheet metal covering 18, typically referred to as lagging, is disposed over the exterior of the insulation 17. This lagging protects the insulation from deterioration as is known in the art.

When the furnace is erected, the windbox wall 16 must be provided with holes to accommodate different mounting tubes for various devices such as a burner 19, an igniter 20, a flame detector 21 and a sight glass (not shown). Each of these devices is respectively mounted within its associated mounting tube 22, 23 and 24.

Each of the mounting tubes 22, 23 and 24 have welded thereto a mounting flange 25, usually of a low carbon or stainless steel material, each mounting flange being installed at the site about the circumference of the respective mounting tube.

The mounting flange is shown in FIG. 2 in greater detail. In the drawing, mounting tubes 22, 23 and 24 are illustrated as engaging with the wall 16 at any angle O to A degrees measured from a perpendicular to the windbox front plate 16.

When any mounting tube, for example reference 22, is installed, a hole 27 may be cut with a torch or other suitable means and thereafter a hole is fabricated through the insulation 17 through the outside portion of the furnace which is more clearly shown in FIG. 1. The flange shown fabricated in FIG. 4 and in sectional view at reference 25 of FIG. 2 is welded to the mounting tube 22 about the circumference thereof at 28; thereafter the lagging is installed over the insulation with an appropriate opening 29 cut therein for accommodating the extension of mounting tube 22. Rivets or other fasteners 26 are utilized to tack the lagging 18 to the flange 25 at various points about the circumference of the mounting tube 22. The flange 25 is formed of a strip of L-shaped material shown in cross section of FIG. 5. The flange 25 material is typically 14 gauges steel, about three inches along the longer end of the L and about a half an inch along the short leg thereof.

The flange material has transverse cuts extending across the longer leg 25A of the stripping 25, as shown by reference numeral 30 in FIG. 3. Each of these cuts 30 is disposed at even intervals of approximately one inch along the entire length of the flange material 25.

The flanges may be installed as the detail in FIG. 3 indicates by a spot weld or some suitable tacking method at a beginning point 31 and thereafter the flange material 25 is bent around the tube as shown by the phantom 25'. FIG. 4 shows the completed flange with the excess flange material 25'' to be removed extending beyond in phantom view. The mounting tube 22 and the flange 25 are then brazed or welded together along the short end of the L-shaped member about the entire circumference of the mounting tube 22. When the lagging 18 is disposed over the insulation 17, each extreme outer end of the mounting flange 33 receives a rivet or suitable fastening device 26 as shown in FIG. 2 and indicated by the arrows 33 in FIG. 4.

The mounting flange 25 may be mounted about almost any size diameter mounting tube, most easily the larger sizes since the bending process is more readily accomplished. However, for small diameter tubes ranging from about 2⅞ inches or less, the flange material 25 may be cut all the way through and one inch L-shaped strips may be welded to the exterior of the mounting tube individually. This provides the suitable material for tacking the lagging to the insulation as described above.

Generally, when installing mounting tubes with less than three inches outer diameter, the mounting angle A should not exceed about 30°, whereas for larger tubes the angle from the horizontal A may be as high as forty-five degrees.

The principles involved in producing the mounting flange described above may also be utilized for mounting square, oval, or elliptical shaped mounting tubes as may be required for the particular installation. The installation procedure remaining generally the same as described above, namely tacking the mounting flange material 25 at one end to the outer periphery of the mounting tube and bending the same around until the full circumference is covered and then welding or brazing the material along the short end of the L-shaped strip to the mounting tube.

The advantages of the present invention are that the strips may be produced in large quantities on rolls or straight strips and the fabrication of the particular flanges may be executed at the erection site rather than producing specifically made flanges for each installation. The flanges may be for objects of various shapes and sizes and no special tools are required to produce the desired end, since any tools necessary would be at the job site in any event. The mounting flange when fabricated is quite stiff and can safely accommodate up to about a three sixteenths diameter hole through it with pop rivets or metal screws which may be used for securing the lagging to the mounting flange. Further, almost any angle can be accommodated as required for the particular job.

While there has been disclosed what at present is considered to be the preferred embodiment of the present invention, it will be obvious to those skilled in the art that various changes and modifications may be made therein without departing from the invention and it is intended in the preceding claims to cover any and all such modifications and changes as fall within the true spirit and scope of the invention.

What I claim is:

1. An improved method for protecting lagging and insulation layers of a furnace windbox wall, wherein the windbox wall has an opening for receiving a mounting tube therethrough suitably welded therein, said windbox wall covered with the insulation layer and the outer lagging layer, said lagging having a suitable opening for the projection of the mounting tube therethrough, wherein the improvement comprises the steps of:

forming a strip of material of L-shaped cross section having a relatively thin gauge, cutting the strip transversely on the L cross section along the longer end thereof, tacking a beginning end of the strip to the exterior surface of the mounting tube; bending and forming said L-shaped member about the circumference of the mounting tube to engage with the beginning thereof, forming a bead along the short end of the L-shaped member engaging with the circumference of the mounting tube for forming a weld therewith such that a flange is formed of strips of the material with radially extending projections; and thereafter suitably fastening the lagging over the windbox and attaching same to the extending radial projections of said flange, such that the opening in the lagging is secured about its periphery for protecting the lagging and intermediate insulation layer.

2. The method described in claim 1 wherein when the circumference of the mounting tube is smaller than about three inches, the method includes the further steps of cutting of the L-shaped member entirely therethrough and attaching individual sections of said L-shaped members to said outer periphery of the object.

3. In a furnace windbox wall having an opening for receiving a mounting tube welded therein and having an insulating layer with sheet metal lagging covering the outside of said wall, said lagging having a hole therein corresponding to the projection of said mounting tube through said windbox wall the improvement comprising:

a protective mounting flange attached to said mounting tube including: a strip of bendable material having an L-shaped cross section, one end leg of the L being substantially longer than the other, said strip having transverse cuts therein extending across the entire length of the longer leg of the member, permitting the strip to be bent circumferentially about the periphery of the mounting tube, said mounting flange when formed completely about the periphery of the mounting tube forming radial strips extending outwardly from the outer surface of the mounting tube and fastened about the periphery of the mounting tube along the surface of the short leg of the L-shaped member, said lagging covering the insulating layer and radial strips, each of said radial strips attached to said lagging by suitable fastening means through each of said legs, whereby the sheet metal lagging may be secured to the flange for preventing damage to the lagging and insulation layer.

4. The apparatus as described in claim 3 wherein each of the strips are about one inch in width and the L-shaped member has a long end of about three inches and a short end of about one half inch and a gauge of about 14.

5. The apparatus of claim 3 wherein the L-shaped strips may be fabricated from a continuous length of material and cut to size for the particular shape and size of the object involved.

6. The apparatus of claim 3 wherein the tube object may be mounted in an opening of a wall and may be mounted at an angle of up to about 45 degrees from a perpendicular to the wall.

7. The apparatus of claim 3 wherein the tube may be mounted in an opening of a wall and may be mounted at an angle of about up to 30 degrees from a perpendicular to the wall for tubes with a diameter of less than about three inches.

* * * * *